(12) United States Patent
Miyashita et al.

(10) Patent No.: US 6,304,611 B1
(45) Date of Patent: Oct. 16, 2001

(54) OFDM MODULATOR AND OFDM MODULATION METHOD FOR DIGITAL MODULATED WAVE HAVING GUARD INTERVAL

(75) Inventors: Atsushi Miyashita; Toshiyuki Akiyama, both of Tokorozawa; Seiichi Sano, Higashiyamato; Nobuo Tsukamoto, Akishima; Tatuhiro Nakada, Kodaira, all of (JP)

(73) Assignee: Hitachi Denshi Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/099,390

(22) Filed: Jun. 18, 1998

(30) Foreign Application Priority Data

Jun. 19, 1997 (JP) ................................................ 9-162579

(51) Int. Cl.$^7$ ............................... H04K 1/10; H04L 27/28
(52) U.S. Cl. .......................... 375/260; 370/210; 332/125
(58) Field of Search ..................................... 370/319, 480, 370/343, 203, 206, 210; 375/259, 260, 261, 239, 295, 229; 331/182; 332/112, 106, 117, 123, 124, 125

(56) References Cited

U.S. PATENT DOCUMENTS

| | | | |
|---|---|---|---|
| 5,063,574 | * 11/1991 | Moose | 375/244 |
| 5,166,924 | * 11/1992 | Moose | 370/289 |
| 5,732,068 | * 3/1998 | Takahashi et al. | 370/206 |
| 5,771,224 | * 6/1998 | Seki et al. | 370/206 |
| 5,790,516 | * 8/1998 | Gudmundson et al. | 370/210 |
| 5,822,323 | * 10/1998 | Kaneko et al. | 370/480 |
| 5,953,311 | * 9/1999 | Davies et al. | 370/210 |
| 6,005,894 | * 12/1999 | Kumar | 375/270 |

* cited by examiner

Primary Examiner—Stephen Chin
Assistant Examiner—Lenny Jiang
(74) Attorney, Agent, or Firm—Antonelli, Terry, Stout & Kraus, LLP

(57) ABSTRACT

An orthogonal frequency division multiplex (OFDM) modulator of such a system as to add guard intervals to a temporal waveform generated by modulating an input data train into a large number of (sub)carriers, conducting quadrature modulation, and outputting an OFDM signal. The OFDM modulator includes an IFFT circuit for conducting inverse fast Fourier transform processing to modulate the input data train into a large number of (sub)carriers, a guard interval adder for adding a guard interval to each effective symbol duration of a composite carrier signal supplied from the IFFT circuit and outputting a resultant signal, a control signal generator for generating, in synchronism with each guard interval of the composite carrier signal having the guard intervals added thereto, such a control signal as to attenuate signal amplitude of the composite carrier signal over an interval substantially equal in length to each guard interval; and an amplitude controller, responsive to the control signal, to attenuate the amplitude of the composite carrier signal supplied from the guard interval adder and output a resultant signal, only over an interval substantially equal in length to each guard interval. The amplitude controller outputting, in remaining intervals, the composite carrier signal supplied from the guard interval adder as it is.

19 Claims, 12 Drawing Sheets

OFDM MODULATOR AND OFDM MODULATION METHOD FOR DIGITAL MODULATED WAVE HAVING GUARD INTERVAL

BACKGROUND OF THE INVENTION

The present invention relates to an OFDM (Orthogonal Frequency Division Multiplex) modulation method and an OFDM modulator used in digital transmission apparatuses of OFDM modulation system.

In recent years, digitization of television broadcasting have been studied. As a modulation system for television broadcasting, the adoption of the OFDM modulation system is regarded as promising.

The OFDM modulation system is one kind of multi-carrier modulation system. In the OFDM modulation system, a large number of digital modulated waves are added together. As the modulation system of each carrier at this time, the QPSK (quadrature phase shift keying) system or the like is used. According to this system, a composite wave (OFDM signal) as shown in FIG. 1 can be obtained.

FIG. 1 illustrates the case where the number of carriers is 24. In FIG. 1, $T_S$ denotes an effective symbol duration (duration of all effective symbols) of one symbol data.

Expression of this OFDM signal using a numerical expression will now be described.

Representing the QPSK signal of each carrier by $\alpha_k(t)$, it can be expressed by equation (1).

$$\alpha_k(t) = a_k(t) \times \cos(2\pi kft) + b_k(t) \times \sin(2\pi kft) \quad (1)$$

Here, k represents a carrier number, and $a_k(t)$ and $b_k(t)$ are data of a kth carrier, and assume the value of $[-1]$ or $[1]$.

Assuming the number of carriers is N, the OFDM signal is a combination of N carriers. Denoting this by $\beta_k(t)$, it can be represented by equation (2).

$$\beta_k(t) = \sum_{k=1}^{N} \alpha_k(t) \quad (2)$$

Assuming now that each component has coefficient values $a_k=0$ and $b_k=1$ in the equation (1) and N=24 in the equation (2), waveforms of the coefficient values $\alpha_k(t)$ in the equation (2) are exemplified in FIG. 1. Representing the equation (2) in the form of a frequency spectrum, a spectrum shown in FIG. 2 is obtained.

In the OFDM system, a guard interval is typically added to each effective symbol duration of the composite carrier signal in order to mitigate the influence of the multi-path. In other words, a guard interval $\Delta T$ is added to an effective symbol duration $V_S$ as shown in FIGS. 3 and 4.

FIG. 3 illustrates an example of the case where a guard interval has been added to a carrier wave of k=1 for simplifying the description. FIG. 4 illustrates an example of the case where a guard interval has been added to a composite carrier signal obtained by combining N=448 carriers.

As shown in FIG. 3, a waveform (a) of an interval $\Delta T/2$ located in a start portion of the effective symbol duration $V_S$ is added after an end edge of the effective symbol duration as a rear guard interval waveform (a') of an interval $\Delta T/2$. In the same way, a waveform (b) of an interval $\Delta T/2$ located in an edge portion of the effective symbol duration $V_S$ is added before a start edge of the effective symbol duration as a front guard interval waveform (b') of an interval $\Delta T/2$. By the sum total of these front and rear guard interval waveforms (b') and (a'), a guard interval of an interval $\Delta T$ is added to one effective symbol duration $V_S$. The entire symbol duration containing the effective symbol duration $V_S$ and the guard interval $\Delta T$, i.e., the entire symbol duration (symbol duration with guard) becomes $T_S$.

By the way, (c) is a rear guard interval added to an immediately preceding effective symbol duration, and (d) is a front guard interval added to an immediately succeeding effective symbol duration. At connection points (changeover points) $t_1$ and $t_2$ of the entire symbol duration, the waveform becomes discontinuous. Especially at the time $t_1$ forming the connection point between the entire symbol duration of X=0 and the entire symbol duration of X=1, the waveform step (level change) becomes large and side lobes are generated as described later.

In the above described example, the front and rear guard intervals having the same interval $\Delta T/2$ are added to the start edge and the end edge of the effective symbol duration, respectively. Alternatively, a front guard interval and a rear guard interval differing in duration and having total duration equivalent to $\Delta T$ may be added to the start edge and the end edge of the effective symbol duration, respectively.

Alternatively, a guard interval having duration of $\Delta T$ may be added to the start edge or the end edge of the effective symbol duration. FIG. 5 is a waveform diagram of the case where a guard interval having duration of $\Delta T$ has added to the end edge of the effective symbol duration for the carrier wave of k=1.

FIGS. 6A and 6B are basic configuration block diagrams of an OFDM modulation/demodulation apparatus using a conventional technique shown in, for example, JP-A-7-321762. Hereafter, the modulation/demodulation operation of the OFDM signal will be described by referring to FIGS. 6A and 6B. As illustrated, an IFFT (Inverse Fast Fourier Transform) unit 81 is used for the OFDM modulation, and a FFT (Fast Fourier Transform) unit 95 is used for demodulation.

In a system of adding guard intervals to a temporal waveform generated by modulating an input data train into a large number of (sub)carriers, a modulation unit (sending side)(OFDM modulator) for conducting orthogonal frequency division multiplex (OFDM) includes an IFFT unit (81) for conducting inverse fast Fourier transform (IFFT) processing to modulate the input data train into a large number of (sub)carriers, a guard interval adder for adding a guard interval to each effective symbol duration of a combined carrier signal supplied from the IFFT unit (81) and outputting a resultant signal, and an quadrature processor (84) for applying quadrature modulation to the signal supplied from the guard interval adder and outputting an OFDM signal.

In other words, in the sending side (modulation unit) T shown in FIG. 6A, inverse Fourier transform is conducted in the IFFT unit 81 by regarding an in phase component I of each carrier as real part data $R_f$ and a quadrature component Q as imaginary part data $I_f$. Thus, a real part signal R and an imaginary part signal I in the time domain are obtained.

To this signal, a signal corresponding to the guard interval is added in the guard interval adder 82. Resultant signals $R_g$ and $I_g$ are subject to D/A conversion in a digital-to-analog (D/A) converter 83 (83a and 83b). By using a carrier signal having a frequency $f_C$ supplied from an oscillator 85 for an analog signal of the real part signal $R_g$ and using a carrier signal shifted in phase by 90° by a phase shift circuit 86 for an analog signal of the imaginary part signal $I_g$, quadrature modulation is conducted in the quadrature modulator 84.

Resultant signals are combined in a synthesizer (adder) 87. An OFDM signal is thus obtained. In FIG. 6A, 84a and 84b denote multipliers.

In the receiving side (demodulation unit) R shown in FIG. 6B, operation opposite to that of the sending side is conducted. An output obtained by demodulating the received OFDM signal in an quadrature demodulator 91 with a carrier signal of a frequency $f_C$ supplied from an oscillator 93 is taken out as a real component. An output obtained by demodulating the received OFDM signal in the quadrature demodulator 91 with the carrier signal shifted in phase by 90° in a phase shifting circuit 92 is taken out as an imaginary component. These demodulated signals are converted to digital signals by an analog-to-digital (A/D) converter 94 (94a, 94b). The digital signals are subject to Fourier transform in a FFT unit 95. OFDM demodulated signals are thus obtained. In FIG. 6B, 91a and 91b denote multipliers.

When conducting fast Fourier transform, a timing signal regenerator 96 is used to attain timing as shown in the receiving side R of FIG. 6B.

For attaining the timing of this fast Fourier transform, signals for timing extraction (hereafter referred to as synchronizing signals) are embedded at the rate of m symbols every M symbols (where m<M) on the sending side T as shown in FIG. 7.

Here, one symbol means the entire symbol duration $T_S$ obtained by adding the guard interval $\Delta T$ to the effective symbol duration $V_S$.

By extracting the synchronizing symbols on the receiving side R, symbol boundaries (connection points) are calculated and timing of fast Fourier transform is attained.

A timing signal regenerator used for this purpose can be implemented by using, for example, a circuit having a configuration as shown in FIG. 8.

To be concrete, a pattern of the synchronizing symbol (such as, for example, a sine wave of a single frequency) 21a is stored in a memory 22 beforehand by using a timing signal regenerator. An A/D converted OFDM signal 21b and the pattern 21a stored in the memory 22 are input to a correlator 21. At the time when the pattern 21a supplied from the memory 22 coincides with the pattern of the OFDM signal 21b, a pulse 96a functioning as a timing signal is generated and supplied to the FFT unit 95. This pulse 96a is used in the FFT unit 95 as the start timing of the fast Fourier transform.

In FIG. 2, a waveform of one out of a plurality of carrier signals (i.e., a waveform of a carrier frequency $f_C \times m$) is indicated by a thick line above the OFDM spectrum. From the waveform, it is understood that a main spectrum occurs at a carrier frequency $f_C \times m$ in an OFDM signal and spectra having frequencies such as $f_C \times (m-1)$ and $f_C \times (m+1)$ occur at fixed frequency intervals adjoining to the frequency $f_C \times m$ while repetitively becoming smaller.

In the OFDM signal having such a characteristic and including a combination of a plurality of carriers, carriers are in mutual orthogonal relations. Therefore, the OFDM signal has such a property that side lobes caused by the discontinuity between symbols of carriers become the 0 level in main spectra of other carriers and the carriers do not affect each other. On the other hand, unnecessary leakage power appear outside the band.

Assuming that the OFDM signal shown in FIG. 2 has a carrier spacing frequency of $f_C$ and includes N carriers, the spectrum of such a sent OFDM wave will now be qualitatively described. In this case, the required bandwidth of the OFDM signal becomes $f_C \times N$.

First of all, in the required bandwidth $f_C \times N$, main spectrum components of a total of N carriers occur at intervals of the frequency $f_C$ so as to form a rectangular shape.

On the other hand, outside the required bandwidth $f_C \times N$, side lobes of N carriers occur overlapping each other while being attenuated. As a result, unnecessary leakage spectra occur outside the required bandwidth $f_C \times N$ in a slope form as illustrated.

As for the level of the leakage spectra appearing outside the band, a level of about −20 dB with respect to each of the carriers contained in the required band is maintained in the vicinity of the required band. Even at a frequency located far away from the required band, the level eventually falls only to approximately −40 dB.

In typical transmission systems, all of the frequency bandwidth (such as, for example, 9 MHz) allowed to be used is used in order to secure the greatest possible transmission capacity.

On the other hand, frequency regions adjacent to the required band are utilized for other communication services. If there is a leakage spectrum other communication is disturbed.

As for the leakage spectra outside the required band, only leakage spectra having a predetermined level or below (such as, for example, −40 dB or below) are allowed.

In the conventional technique the leakage spectra outside the required band are suppressed by using a filter.

Unnecessary radiation in a frequency region located far away from the required band can be easily removed by only inserting a BPF (bandpass filter) having a gentle characteristic in a high frequency portion, an intermediate frequency portion, or a baseband portion.

The above described conventional technique has problems caused by use of a filter that are not taken into consideration. Further, by use of a filter it is difficult to prevent the cost and size of the apparatus from increasing.

For removing the radiation having an in-band carrier ratio of about −20 dB appearing in the vicinity of the required frequency band by using a filter as in the conventional technique, there is needed a filter attenuating the output level by at least 20 dB in the vicinity of the required band located outside the required band.

For obtaining sharp attenuation as large as 20 dB in such a small frequency difference, however, a high performance filter having a large number of stages, i.e., a large sized, expensive filter is needed. This makes it difficult to reduce the size and cost of the apparatus.

On the other hand, if a filter satisfying practical conditions concerning the cost and so on is used, a sharp attenuation characteristic cannot be expected. In the case of the OFDM signal having a sharp spectrum characteristic, therefore, even the carriers in the required band are attenuated.

In this case, therefore, it is difficult to avoid the influence upon other communication with the exception of adopting such a design as to decrease the required bandwidth and consequently the transmission capacity.

SUMMARY OF THE INVENTION

An object of the present invention is to provide an OFDM modulation method and an OFDM modulator eliminating the above described problems of the conventional technique.

Another object of the present invention is to provide an OFDM modulation method and an OFDM modulator reconciling the sufficient utilization of a frequency band and sufficient suppression of unnecessary radiation without depending upon the performance of the filter.

In order to achieve the above described objects, an orthogonal frequency division multiplex (OFDM) modulation method of such a system as to add guard intervals to a temporal waveform generated by modulating an input data train into a large number of (sub)carriers, quadrature modulation, and output an OFDM signal is provided. The method of the present invention, includes the steps of:

(a) conducting inverse fast Fourier transform (IFFT) processing to modulate the input data train into a large number of (sub)carriers;

(b) adding a guard interval to a start edge or an end edge of each effective symbol duration of a composite carrier signal obtained by the step (a); and (c) attenuating amplitude of the composite carrier signal having the guard intervals added thereto and outputting a resultant signal, only over an interval substantially equal in length to the each guard interval, and outputting, in remaining intervals, the composite carrier signal supplied from the guard interval adder as it is.

In an example of the present invention in which guard intervals of $\Delta T/2$ are added to both edges of each effective symbol duration, the step (c) includes the step of gradually increasing attenuation of the amplitude of the composite carrier signal having the guard intervals added thereto, substantially from a start point of the each guard interval, maximizing the attenuation nearly in a central part of the guard interval to make the amplitude of the composite carrier signal equal to substantially zero, thereafter gradually decreasing the attenuation, and making the attenuation equal to zero substantially at an end point of the guard interval.

According to the present invention, the composite carrier signal having the guard intervals added thereto is thus attenuated in amplitude and output, only over an interval substantially equal in length to the each guard interval. Therefore, a level change at changeover point (i.e., connection point) of each symbol is made gentle. As a result, the occurrence of side lobes caused by each lobe can be suppressed.

In the above described example, the attenuation of the amplitude of the composite carrier signal having the guard intervals added thereto is gradually increased substantially from a start point of the each guard interval, maximized nearly in a central part of the guard interval to make the amplitude of the composite carrier signal equal to substantially zero, thereafter gradually decreased, and made equal to zero substantially at an end point of the guard interval. Therefore, a level change at changeover point (i.e., connection point) of each symbol is made more gentle. As a result, the occurrence of side lobes caused by each lobe can be suppressed.

In an example of the present invention in which a guard interval of $\Delta T$ is added to a start edge or an end edge of each effective symbol duration, the step (c) includes the step of attenuating signal amplitude of the composite carrier signal over an interval which centers around a connection point between the guard interval and an effective symbol duration adjacent thereto and which is substantially equal in length to the guard interval.

In this way, the composite carrier signal is attenuated over an interval which centers around a connection point between the guard interval and an effective symbol duration adjacent thereto, and at the connection point having the greatest difference in level, the attenuation is maximized and the amplitude of the signal is made equal to nearly zero. As the entire signal, therefore, the difference in level of the waveform becomes extremely small.

As a result, required specifications for the filter can be made loose. Owing to the lowering in the filter order, the cost and size of the filter can be reduced. Furthermore, even the filter itself can be eliminated.

DESCRIPTION OF THE PREFERRED EMBODIMENTS

Embodiments of an OFDM modulator according to the present invention will now be described in detail by referring to the accompanying drawings.

Figure 6A:
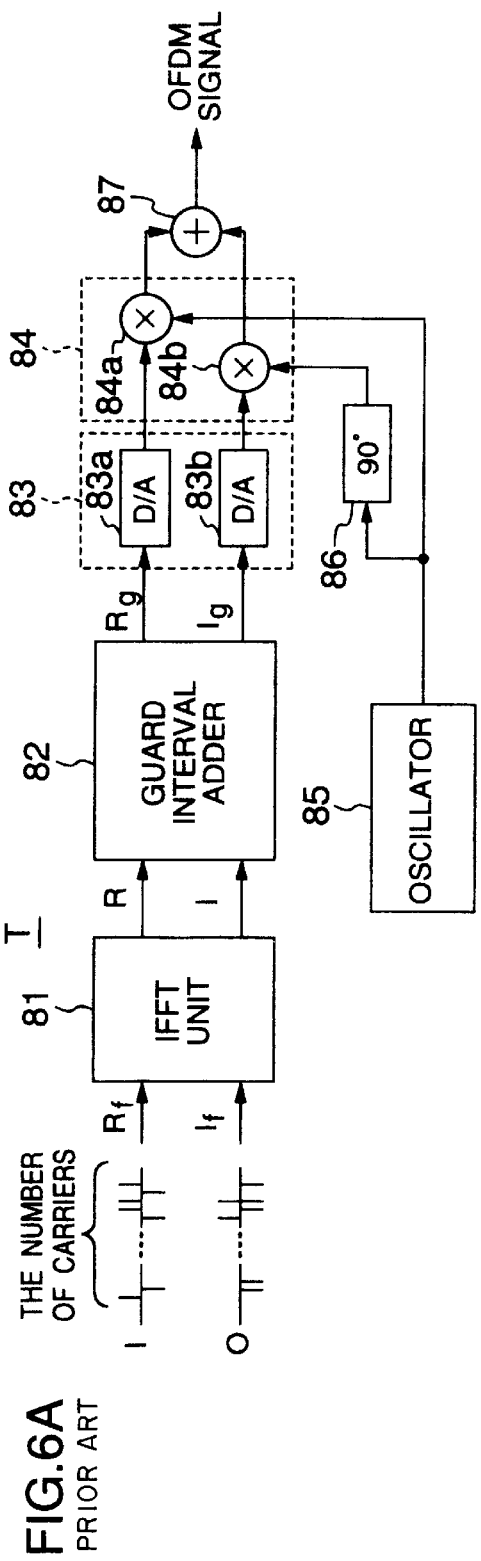
FIG. 6A is a block diagram showing an example of the configuration of a modulation unit of a conventional OFDM modulation/demodulation apparatus.
Figure 6B:
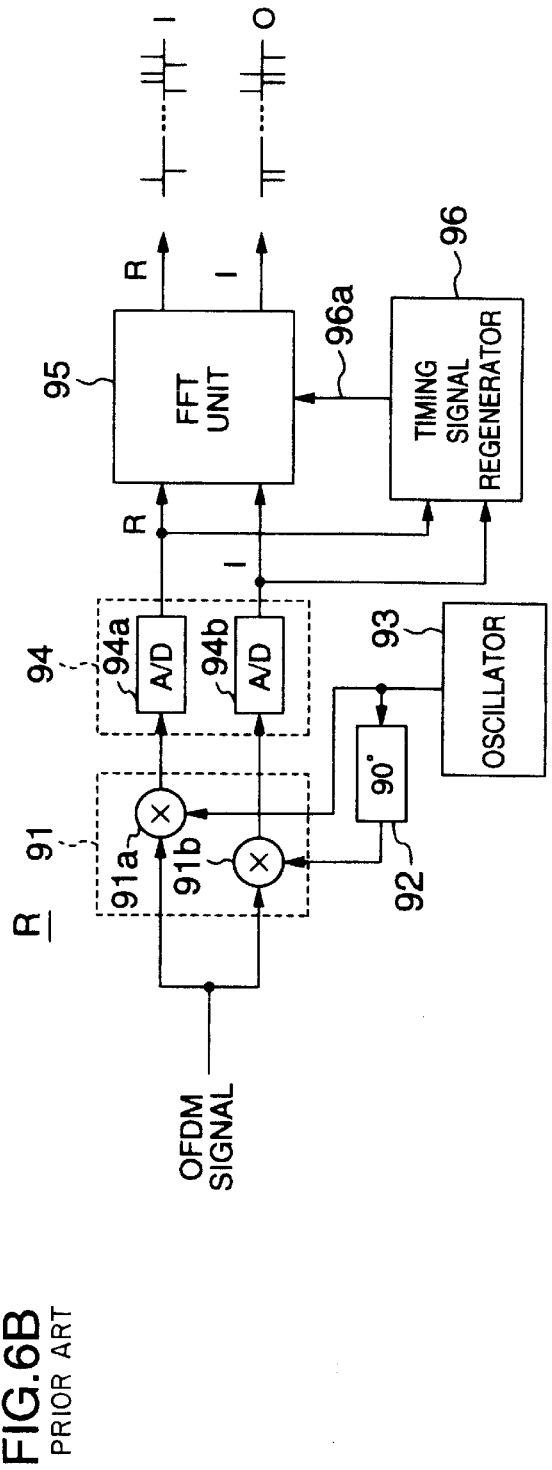
FIG. 6B is a block diagram showing an example of the configuration of a demodulation unit of the conventional OFDM modulation/demodulation apparatus.
Figure 7:
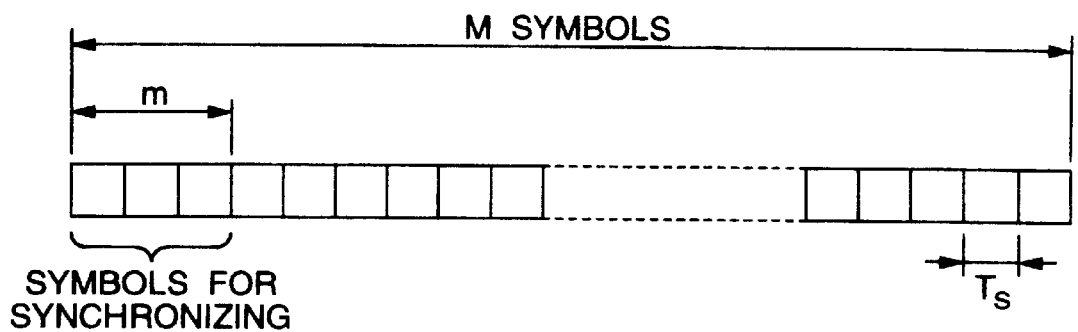
FIG. 7 is a diagram showing the configuration of an OFDM signal.
Figure 8:
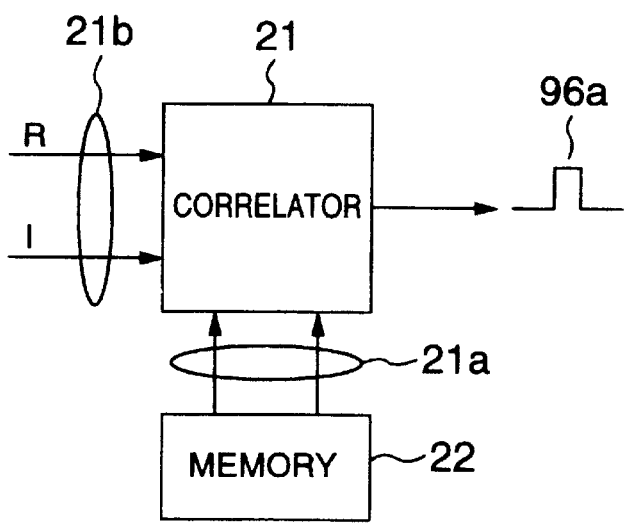
FIG. 8 is a block diagram showing an example of the configuration of a timing signal regenerator included in the demodulation unit of the OFDM modulation/demodulation apparatus of FIG. 6B.
Figure 9:
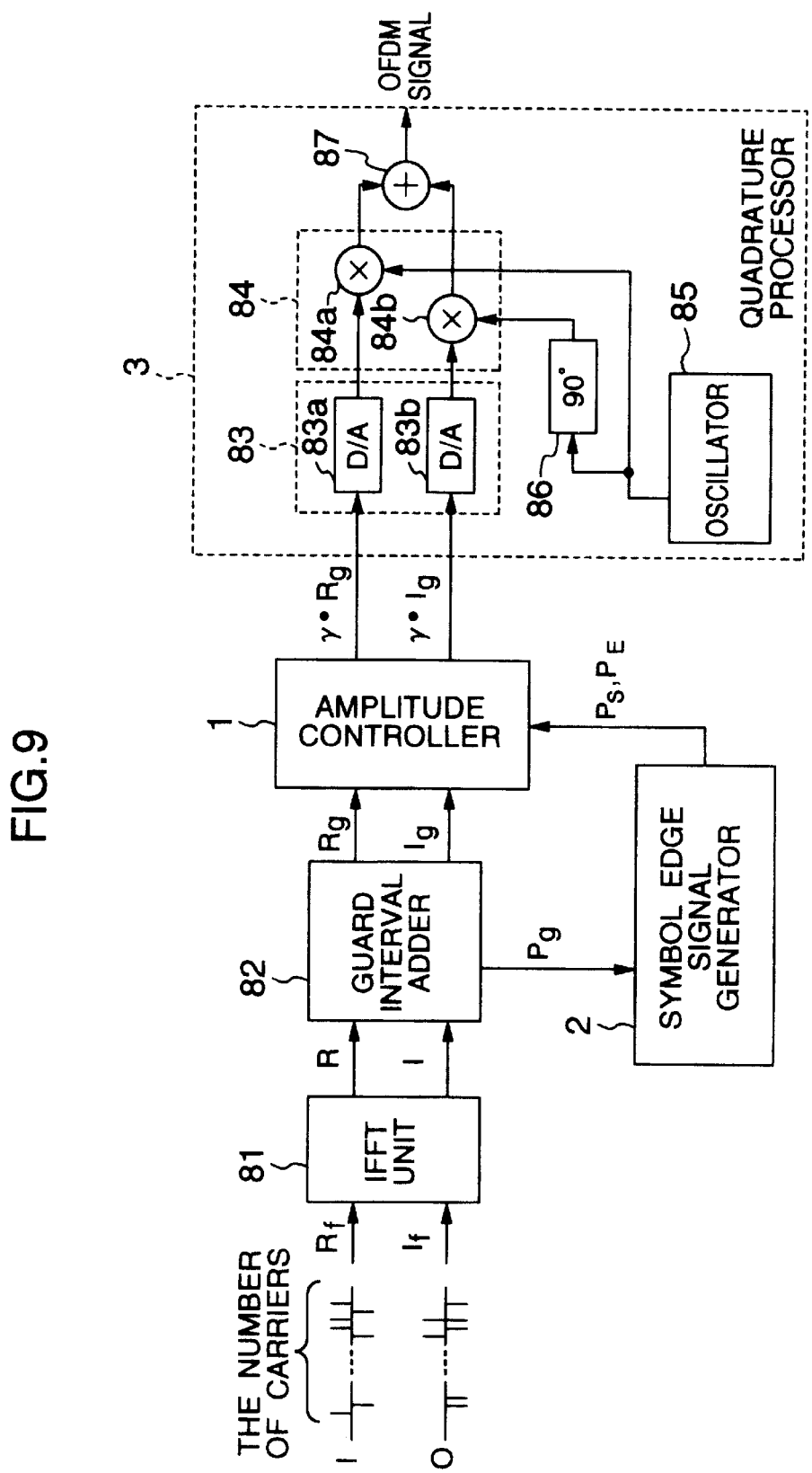
FIG. 9 is a block diagram showing the configuration of an OFDM modulator according to an embodiment of the present invention.

FIG. 9 is a block diagram showing the configuration of an OFDM modulator according to an embodiment of the present invention. In FIG. 9, components having the same configuration as those of the modulation unit of FIG. 6A are denoted by like reference characters, and description thereof will be omitted.

Figure 1:
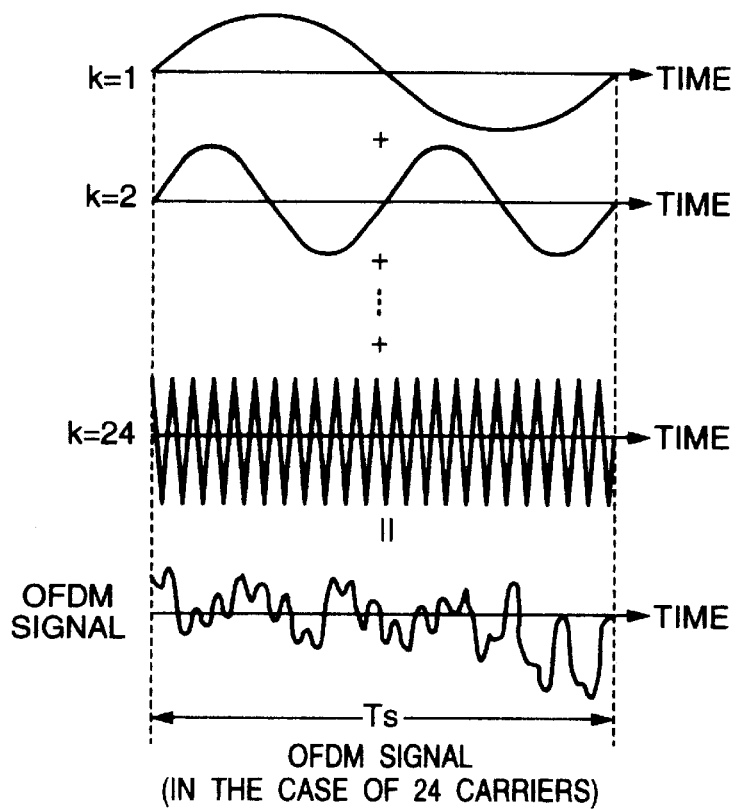
FIG. 1 is a diagram showing an example of the waveform of an OFDM signal.
Figure 2:
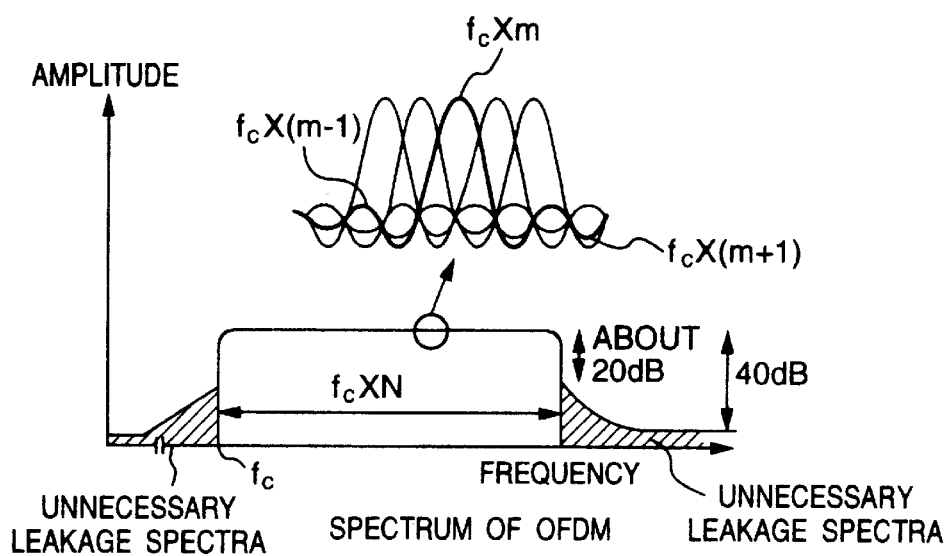
FIG. 2 is a diagram showing the frequency spectrum of an OFDM signal.
Figure 3:
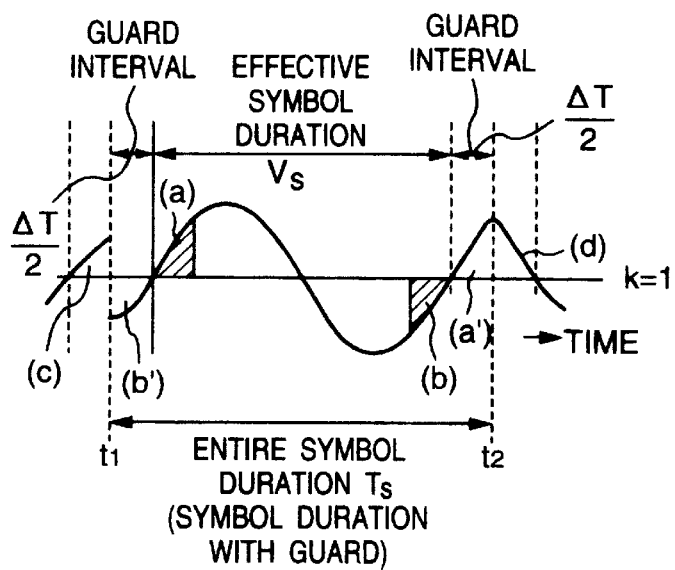
FIG. 3 is a waveform diagram showing such a state that front and rear guard intervals each having duration of $\Delta T/2$ have been added to a carrier wave of k=1.
Figure 4:
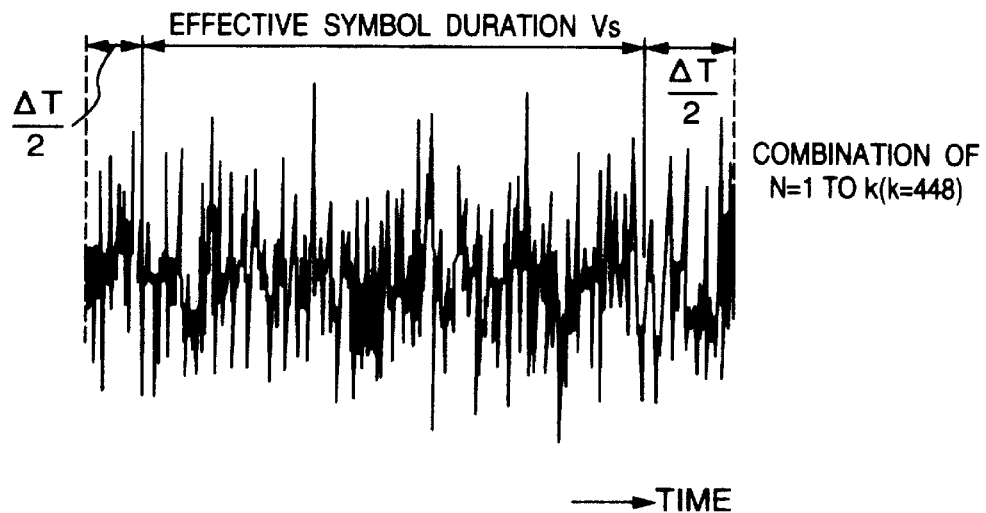
FIG. 4 is a waveform diagram showing such a state that guard intervals have been added to a composite carrier signal of 448 carrier waves.

In the present embodiment, the present invention is applied to such an OFDM modulation system that a front guard interval and a rear guard interval having the same duration $\Delta T/2$ have been respectively added to the start edge and the end edge of the effective symbol duration as shown in FIG. 3. The OFDM modulator of FIG. 9 includes an IFFT unit 81, a guard interval adder 82, an amplitude controller 1, a symbol edge signal generator 2, and an quadrature processor 3. The quadrature processor 3 includes a D/A converter 83, a quadrature modulator 84, an oscillator 85, a phase shifter 86, and a synthesizer 87. With the exception of the amplitude controller 1 and the symbol edge signal generator 2, the present embodiment has the same configuration as the sending side T of the conventional technique described with reference to FIG. 6A.

Therefore, output signals R and I of the IFFT unit 81 are input to the guard interval adder 82. Signals $R_g$ and $I_g$ obtained by the guard interval adder 82 are input to the amplitude controller 1. Output signals $\gamma \cdot R_g$ and $\gamma \cdot I_g$ of the amplitude controller 1 are input to the quadrature processor 3.

The amplitude controller 1 is supplied with a pulse (symbol edge signal) $P_E$ generated at the end edge of the effective symbol duration $V_S$ and a pulse (symbol edge signal) $P_S$ generated at a time point immediately preceding the start of the effective symbol duration. From the time point of occurrence of the pulse $P_E$, the amplitude of each of the input signals $R_g$ and $I_g$ is made smaller in a slope form with the advance of time. At the time point of occurrence of the pulse $P_S$, these signals are made substantially equal to zero in amplitude. Furthermore, thereafter, the amplitude of each of the input signals $R_g$ and $I_g$ is made larger in a slope form with the passage of time. At the time point of disappearance of the pulse $P_S$, such processing as to restore the amplitude of each of the input signals $R_g$ and $I_g$ to the original amplitude is conducted. The amplitude controller 1 functions to output the signals $\gamma \cdot R_g$ and $\gamma \cdot I_g$ subject to such processing.

The symbol edge signal generator 2 is supplied with a pulse $P_g$ indicating the guard interval from the guard interval adder 82. The symbol edge signal generator 2 functions to output the pulse $P_E$ representing the end time point of the effective symbol duration and the pulse $P_S$ representing the start time point of the next effective symbol duration to the amplitude controller 1 on the basis of the pulse $P_g$.

Over an interval between the end time point of an effective symbol and the start time point of the next effective symbol, the signals $R_g$ and $I_g$ lowered in level are obtained as the output signals $\gamma \cdot R_g$ and $\gamma \cdot I_g$ of the amplitude controller 1. As a result, generation of side lobes by each carrier can be sufficiently suppressed as described below.

The configuration and operation of each component will now be described more concretely.

Figure 10:
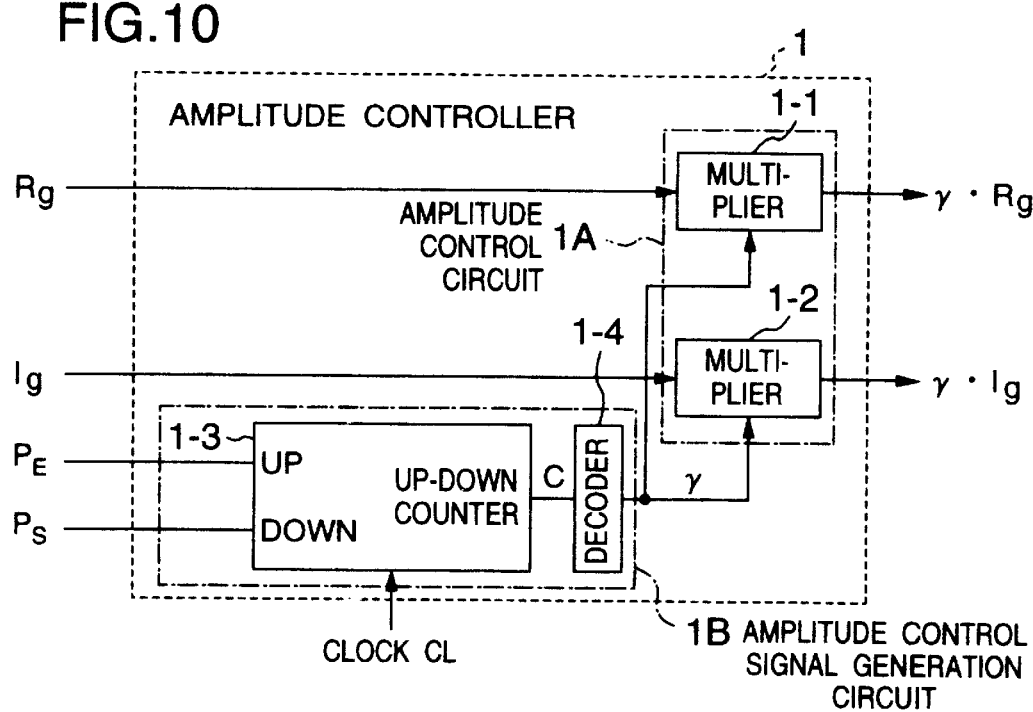
FIG. 10 is a block diagram showing an example of the configuration of an amplitude controller shown in FIG. 9.

First, the amplitude controller 1 includes an amplitude control circuit 1A and an amplitude control signal generation circuit 1B as shown in FIG. 10. The amplitude control circuit 1A includes multipliers 1-1 and 1-2. The amplitude control signal generation circuit 1B includes an up-down counter 1-3 and a decoder 1-4.

To an input terminal of the multiplier 1-1, an input line of the signal $R_g$ is connected. To an input terminal of the multiplier 1-2, an input line of the signal $I_g$ is connected. To multiplying coefficient terminals of the multipliers 1-1 and 1-2, an output $\gamma$ of the decoder 1-4 is input as the multiplying coefficient.

To an up count terminal UP of the up-down counter 1-3, the pulse $P_E$ generated at the end time point of the effective symbol duration is input. To a down count terminal DOWN of the up-down counter 1-3, the pulse $P_S$ generated at the time point immediately preceding the start of the effective symbol duration is input.

A count output c of this up-down counter 1-3 is input to the decoder 1-4. As a result, the above described multiplying coefficient $\gamma$ is generated from a decode output of this decoder 1-4 and input to the multipliers 1-1 and 1-2.

From output terminals of the multipliers 1-1 and 1-2 multiplication results $\gamma \cdot R_g$ and $\gamma \cdot I_g$ are output, respectively. The decoder 1-4 has such a configuration that the multiplying coefficient $\gamma$ becomes $\gamma = \gamma_0$ ($\gamma_0 = 1.0$) when the count value c of the up-down counter 1-3 is $c_0$, thereafter $\gamma$ is linearly decreased as the count value c is increased, and $\gamma$ becomes $\gamma = \gamma_1$ ($\gamma_1 \approx 0$) when the count value c is $c_1$.

The up-down counter 1-3 is supplied with a clock signal CL from a clock generator (not illustrated). The up-down counter 1-3 has such a configuration that count up is caused, i.e., the count value is increased in response to a clock signal while the input signal $P_E$ is present on the up count terminal, and count down is caused, i.e., the count value is decreased in response to a clock signal while the input signal $P_S$ is present on the down count terminal.

Figure 11:
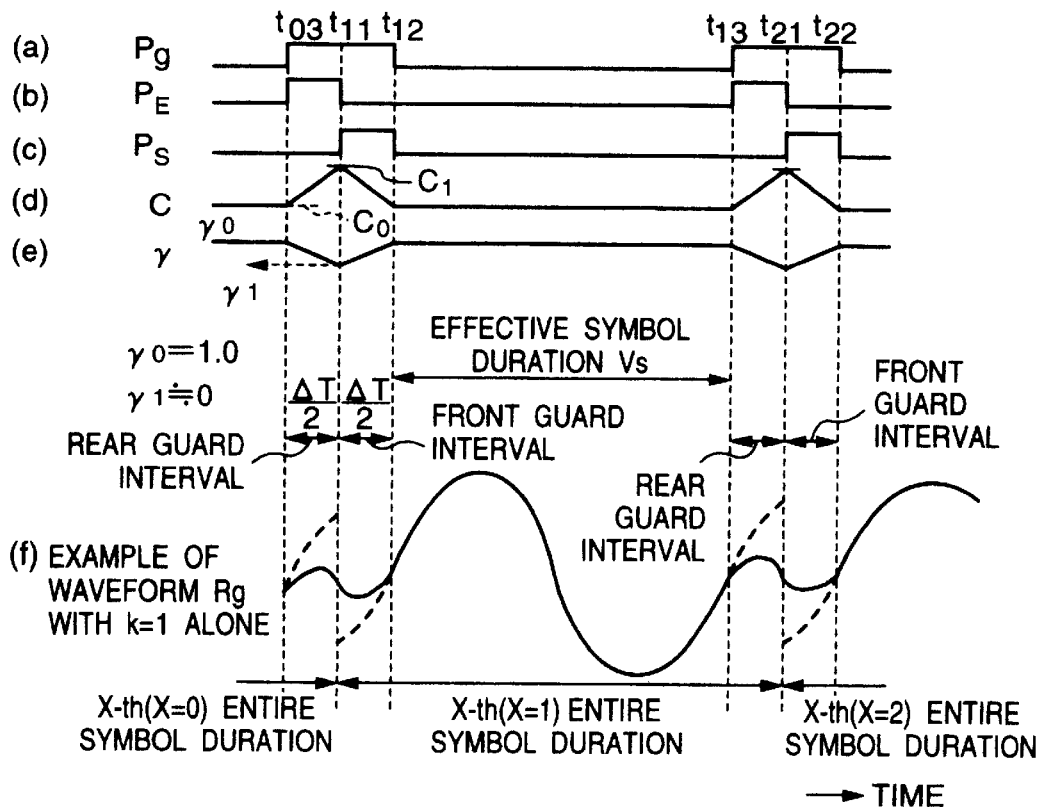
FIG. 11 is a timing chart of signals for explaining the operation of the amplitude controller shown in FIG. 10.

Operation of the amplitude controller 1 will now be described by referring to a timing chart of various signals of FIG. 11.

First of all, the pulse $P_E$ appears over an interval between time $t_{X3}$ and time $t_{(X+1)1}$ of every symbol (Xth symbol). The pulse $P_S$ appears over an interval between time $t_{X1}$ and time $t_{X2}$ of every symbol.

In the case of the symbol with X=0, the count value c of the up-down counter 1-3 assumes a value of $c_0$ until a time $t_{03}$, counts up over an interval between the time $t_{03}$ and time $t_{11}$, and reaches a value $c_1$ at the time $t_{11}$.

As illustrated, therefore, the multiplying coefficient $\gamma$ is also changed linearly from $\gamma_0$ ($\gamma_0 = 1.0$) to $\gamma_1$ ($\gamma_1 \approx 0$) over an interval between the time $t_{03}$ and the time $t_{11}$. Over the interval between the time $t_{03}$ and the time $t_{11}$, therefore, each of the outputs $\gamma \cdot R_g$ and $\gamma \cdot I_g$ respectively of the multipliers 1-1 and 1-2 is also decreased gradually from a level in the case of absence of amplitude control as represented by a broken line shown in (f) of FIG. 11 (which is referred to as level 1.0) to level 0 (because $\gamma_1 \approx 0$) and becomes as represented by a solid line. In (f) of FIG. 11, broken lines represent signal waveforms of the guard interval obtained before the amplitude control is applied.

Subsequently, over an interval between the time $t_{11}$ and time $t_{12}$, the count value c of the up-down counter 1-3 is restored from the value c1 to the value $c_0$. As a result, the multiplying coefficient $\gamma$ is also increased linearly from $\gamma_1$ ($\gamma_1 \approx 0$) to $\gamma_0$ ($\gamma_0 = 1.0$). Over the interval between the time $t_{11}$ and the time $t_{12}$, therefore, each of the outputs $\gamma \cdot R_g$ and $\gamma \cdot I_g$ respectively of the multipliers 1-1 and 1-2 is also restored gradually from level 0 to the original level of the case where the amplitude control is not applied, as represented by a broken line of (f) of FIG. 11.

Also in the guard intervals after the next time $t_{13}$, the same operations are repeated one after another.

In this embodiment, the amplitude control circuit 1A is formed by using the multipliers. Even if a method using a ROM table is adopted, however, the amplitude control circuit 1A can be implemented in the same way.

Figure 12:
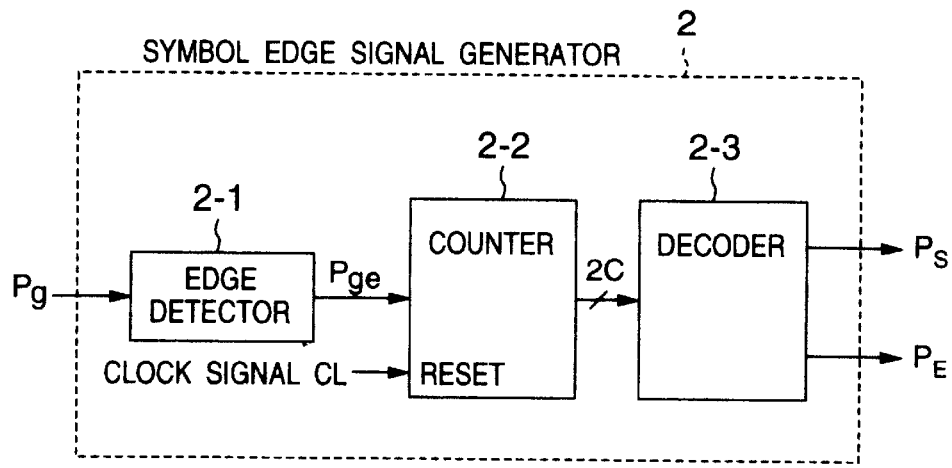
FIG. 12 is a block diagram showing an example of the configuration of a symbol edge signal generator shown in FIG. 9.

As shown in FIG. 12, the symbol edge signal generator 2 is formed by an edge detector 2-1, a counter 2-2, and a decoder 2-3.

First of all, the edge detector 2-1 is supplied with a pulse $P_g$ indicating a guard interval generated between time $t_{X3}$ and $t_{(X+1)2}$ from the guard interval adder 82. As shown in (a) of FIG. 13, the edge detector 2-1 detects the start point (rising edge) of the pulse $P_g$ and generates an edge signal $P_{ge}$. This edge signal $P_{ge}$ is input to a reset terminal of the counter 2-2, and used to conduct reset operation for restoring the count value $2c$ of the counter 2-2 to 0 whenever time $t_{X3}$ is reached.

The counter 2-2 conducts count-up operation in response to a clock signal CL supplied from a clock generator which is not illustrated. The counter 2-2 has such a configuration as to be reset by the edge signal $P_{ge}$. In synchronism with the pulse $P_g$, therefore, the counter 2-2 repeats the count operation with a period equivalent to the interval between $t_{X3}$ and $t_{(X+1)3}$, which is equal to the entire symbol duration.

Figure 13:
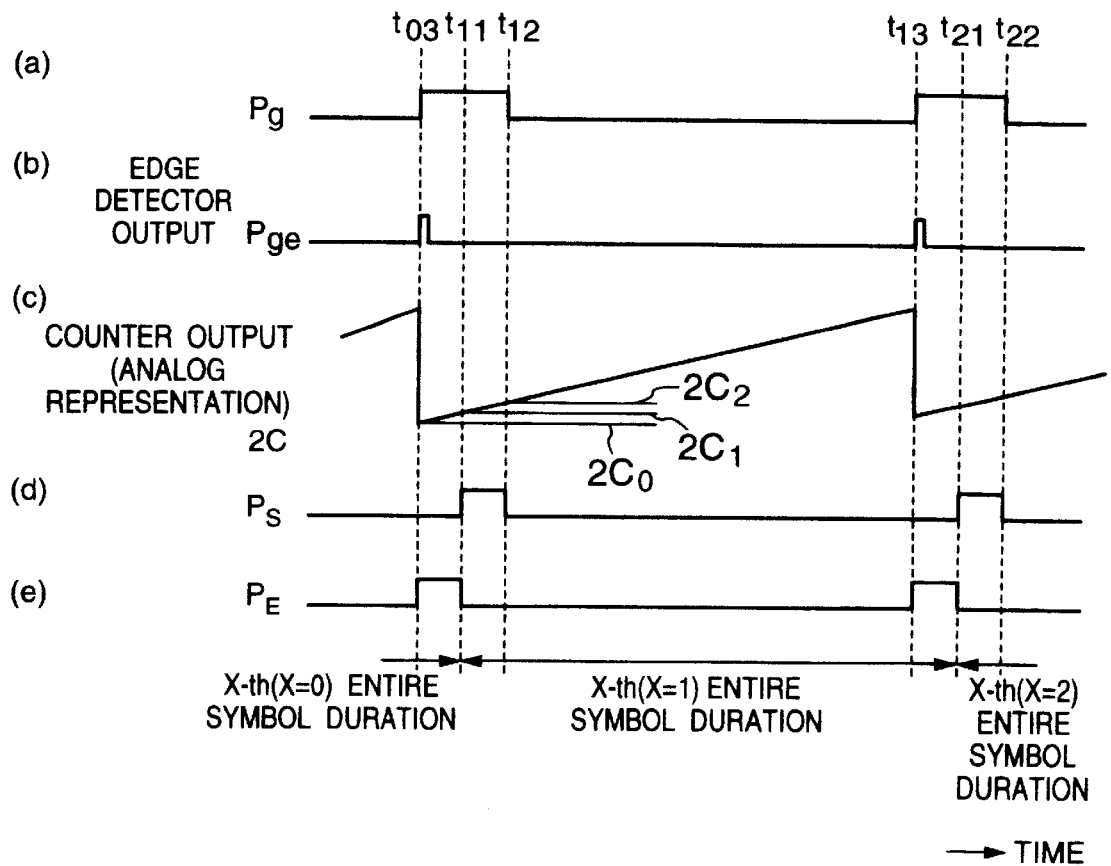
FIG. 13 is a timing chart of signals for explaining the operation of the symbol edge signal generator shown in FIG. 12.

As a result, a count output $2c$ of the counter 2-2 takes the shape of a sawtooth waveform having the interval between $t_{X3}$ and $t_{(X+1)3}$ as its period as represented by an analog form in (c) of FIG. 13.

The decoder 2-3 decodes the count output $2c$ of the counter 2-2. The decoder 2-3 functions to generate the pulse $P_E$ representing the end time point of a symbol duration in a transition of the count value from $2c_0$ to $2c_1$, and generate the pulse $P_S$ representing the start time point of a symbol duration in a transition of the count value from $2c_1$ to $2c_2$.

By supplying these pulses $P_E$ and $P_S$ to the amplitude controller 1, therefore, the signal level is lowered over the duration of the guard intervals between the end time point of an effective symbol and the start time point of the next effective symbol. As a result, occurrence of side lobes caused by discontinuity of connection points between symbols in each carrier can be sufficiently suppressed. This point will now be described in more detail.

As is well known, a signal formed by a waveform having a symbol period of $T_S$ has a fundamental wave having a frequency of $1/T_S$ and harmonic waves each having a frequency of $n/T_S$ (where n is an integer).

For example, a complete rectangular wave having a period of $T_S$ has infinite odd harmonic spectra having frequencies $3/T_S$, $5/T_S$, $7/T_S$, . . . . On the other hand, it is well known that a sine wave having a period $T_S$ has only a spectrum having a frequency of $1/T_S$, and it does not contain any harmonic.

For simplifying the description, it is now assumed that the real part signal $R_g$ has a waveform close to that shown in FIG. 3 having only k=1 in the equation (2). At this time, the first temporal waveform with X=0 is sin (2πft) itself shown in FIG. 3. The next symbol with X=1 has identically sin (2πft). By taking, as an example, the case where the largest quantity of unnecessary spectra are generated by such a repetition, description will be given by referring to FIG. 11.

Under this condition, not only the fundamental spectrum sin (2πft), but also the magnitude of the difference in level of the waveform at the time $t_{11}$ located at the connection point between the symbol with X=0 and the symbol with X=1 influences the quantity of the unnecessary spectra. In other words, if the difference in level of the waveform at the time $t_{11}$ between the rear guard interval and the front guard interval is slight, then the waveforms in the rear guard interval and the front guard interval are close to the continuous sine wave, and spectra other than the fundamental wave become nearly 0. If the difference in level of the waveform at the time $t_{11}$ between the rear guard interval and the front guard interval is large as in the case shown in (f) of FIG. 11, however, then the existence of this difference in level becomes equivalent to the existence of a rectangular wave, and odd harmonics contained in the rectangular wave are additionally mixed in.

By the amplitude control described above, however, the waveform levels at time $t_{11}$ near the connection point between the rear guard interval and the front guard interval are made substantially 0. Therefore, the waveform level becomes continuous and the level difference is reduced or made equal to 0. This results in such a state that nearly only the fundamental wave spectrum is contained. Unnecessary harmonics are also limited.

Figure 14:
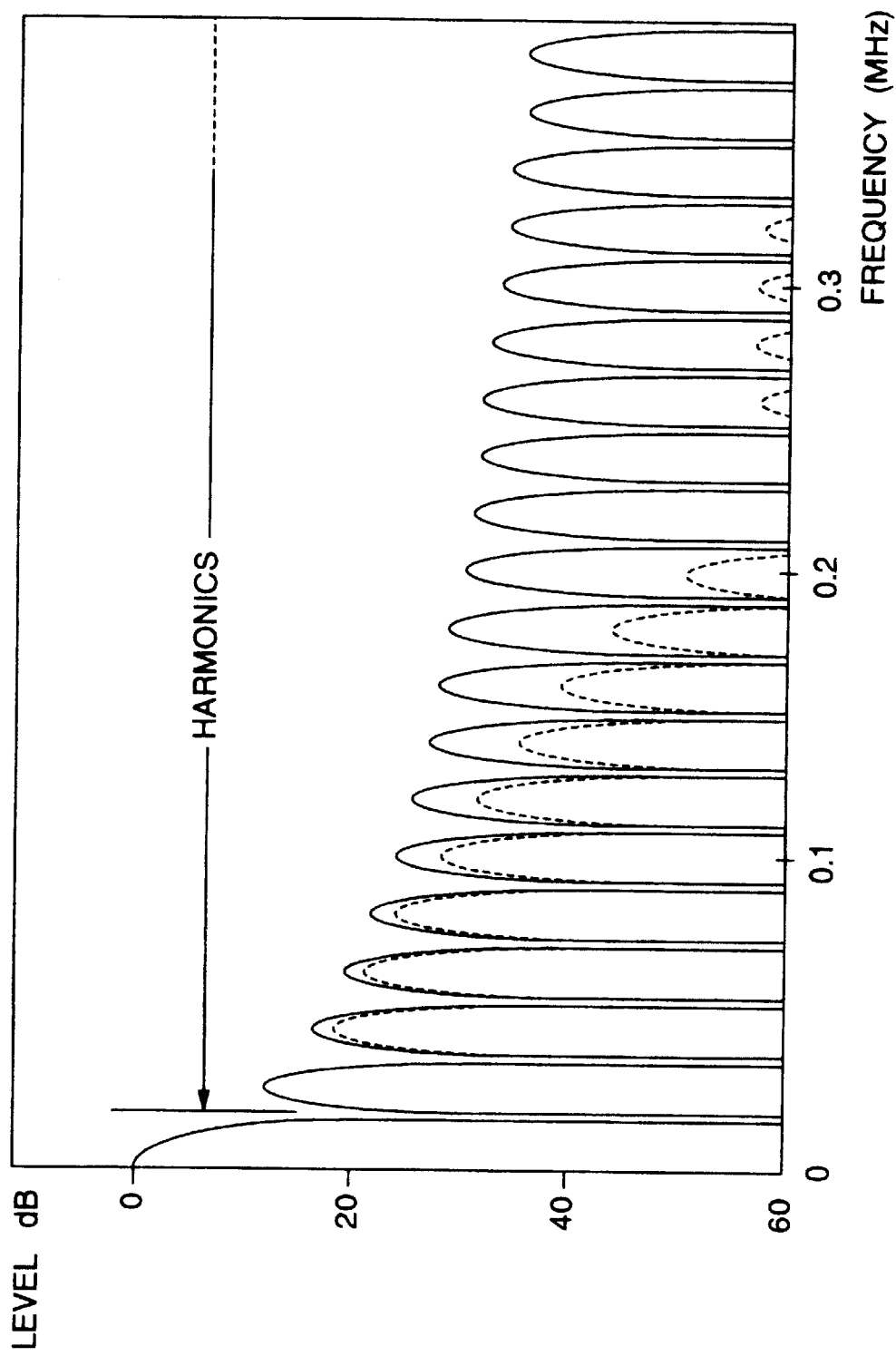
FIG. 14 is a waveform diagram showing a simulation result of OFDM modulator outputs in a conventional technique and the present invention.

Simulation results of the output signals of OFDM modulators respectively using the conventional technique and the present embodiment are exemplified in FIG. 14.

In the illustrated waveforms, broken lines represent the waveform in the case where the amplitude in the rear and front guard intervals is limited according to the present embodiment. Solid lines represent the waveform in the case where the amplitude is not limited (conventional technique).

This example shows the case where guard intervals of 256 samples are provided for an effective symbol of 1024 samples. In the case of the conventional technique represented by the solid lines, the harmonic spectrum falls to only −20 dB to −30 dB in a band located on the immediately left side of the center of FIG. 14. In the case of the present embodiment limited in amplitude over the guard intervals and represented by broken lines, however, the harmonic spectrum is suppressed to −40 dB which substantially poses no problem.

In other words, if in the above described embodiment the level change at the connection point (changeover point) between symbols is made a gentle change instead of the steep change, the approximate shape changes from the rectangular wave to a sinusoidal shape. From qualitative analogy as well, therefore, it can be easily understood that the contained harmonic components are reduced.

According to the above described embodiment, therefore, occurrence of side lobes caused by each carrier is suppressed. As a result, required specifications for the filter can be mitigated. This results in an effect that the filter can be reduced in cost and size owing to the lowered order. Furthermore, it becomes possible to omit the filter itself.

The influence of the waveform gentled by the above described embodiment will now be considered. In the case of the OFDM, a guard interval is added to each of the start edge and the end edge of each effective symbol, and the guard intervals which are not used at the time of demodulation on the receiving side exist in the signal.

As already described, the guard intervals are added for the purpose of preventing components of other symbols from being mixed in by the multi-path or the like.

As a result, the amplitude controller 1 in the above described embodiment mainly conducts such processing as to make the amplitude small over the guard intervals. Therefore, the amplitude controller 1 exerts little influence upon the true information actually used at the time of demodulation. Without lowering the information transfer function, therefore, the above described embodiment can sufficiently suppress the occurrence of side lobes, reduce the out-band leakage spectra, and certainly lower the dependence upon the filter.

In the case where the present embodiment is applied to a system having an OFDM parameter in which the ratio of the guard interval to the entire symbol duration has been set to a larger value, the above described effect becomes greater.

Heretofore, the present invention has been described by referring to an embodiment in which the amplitude control is conducted in the digital signal system. As a matter of course, however, the amplitude limiting may be effected in an analog portion following the D/A converter 83 included in the quadrature processor 3.

Figure 15:
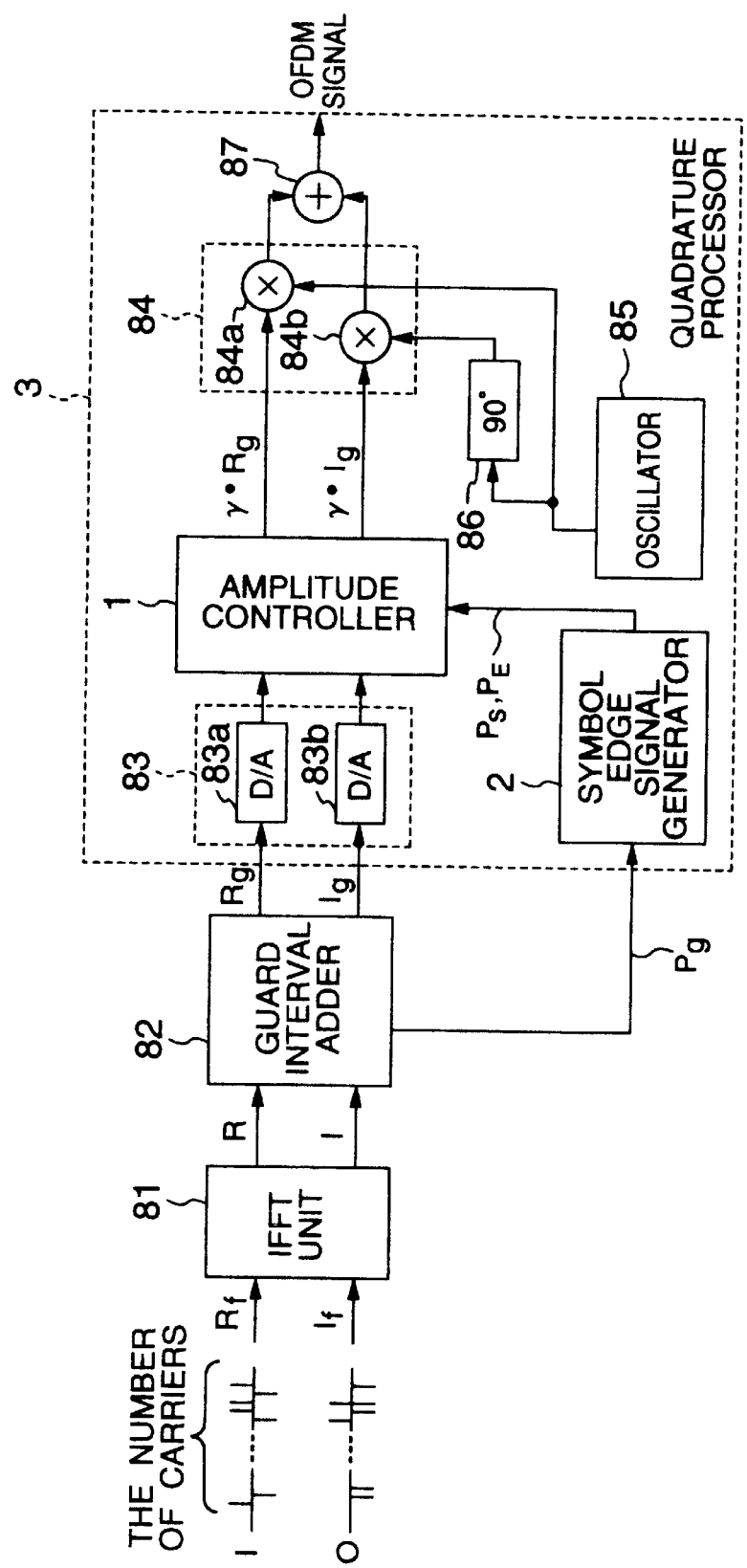
FIG. 15 is a block diagram showing the configuration of the OFDM modulator according to another embodiment of the present invention.

FIG. 15 shows such a different embodiment of the present invention. In this embodiment, the symbol signal edge generator 2 and the amplitude controller 1 shown in FIG. 9 are disposed after the D/A converter 83 of the quadrature processor 3. The operation of the present embodiment is similar to that of the embodiment of FIG. 9, and consequently a similar effect is obtained.

In the above described embodiments, the interval over which the amplitude of each of the signals $R_g$ and $I_g$ is reduced, i.e., the interval over which the multiplying coefficient γ is made less than 1.0 is made coincident with the guard interval ΔT. However, the interval over which the multiplying coefficient γ is made less than 1.0 needs only be substantially equal to the guard interval ΔT, and may be longer than the guard interval ΔT or shorter than the guard interval ΔT. Here, the expression that the interval over which the multiplying coefficient γ is made less than 1.0 is substantially equal to the guard interval ΔT means that the interval over which the multiplying coefficient γ is made less than 1.0 is preferably an interval having duration approximately 10% of the entire symbol duration $T_S$. If the interval over which the multiplying coefficient γ is made less than 1.0 is to be set longer than the guard interval ΔT, then the rising edge of the pulse $P_E$ is made earlier than the time $t_{X3}$, and/or the falling edge of the pulse $P_S$ is made later than the time $t_{X2}$. On the other hand, if the interval over which the multiplying coefficient γ is made less than 1.0 is to be set shorter than the guard interval ΔT, then the rising edge of the pulse $P_E$ is made later than the time $t_{X3}$, and/or the falling edge of the pulse $P_S$ is made earlier than the time $t_{X2}$.

Figure 16:
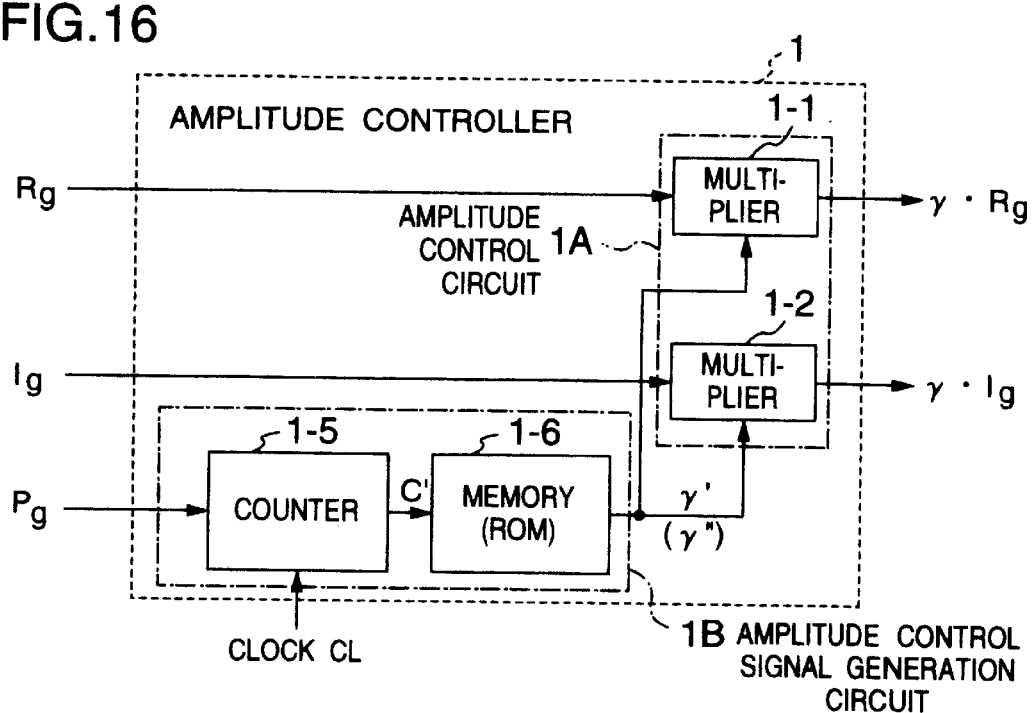
FIG. 16 is a block diagram showing an example of the configuration of the amplitude controller in still another embodiment of the present invention.

In another embodiment hereafter described and shown in FIG. 16, the interval over which the multiplying coefficient γ is made less than 1.0 needs only be substantially equal to the guard interval ΔT in the same way.

For example, in the case where 25% of the effective symbol duration is the guard interval, the interval over which the multiplying coefficient γ is made less than 1.0 is made at most 10% of the entire symbol duration $T_S$.

In the above described embodiment, the multiplying coefficient γ is linearly decreased from 1.0 to approximately 0 over the rear guard interval between $t_{X3}$ and $t_{(X+1)1}$, and the multiplying coefficient γ is linearly increased from approximately 0 to 1.0 over the front guard interval between $t_{X1}$ and $t_{X2}$. In this case, however, the difference in level of the waveform becomes somewhat large at time $t_{X3}$ and time $t_{X2}$, which are the start time point of the rear guard interval and the end time point of the front guard interval, respectively. Therefore, it is desirable to make gentle the change ratio of the multiplying coefficient γ at the start time point of the rear guard interval and the end time point of the front guard interval.

Figure 17:
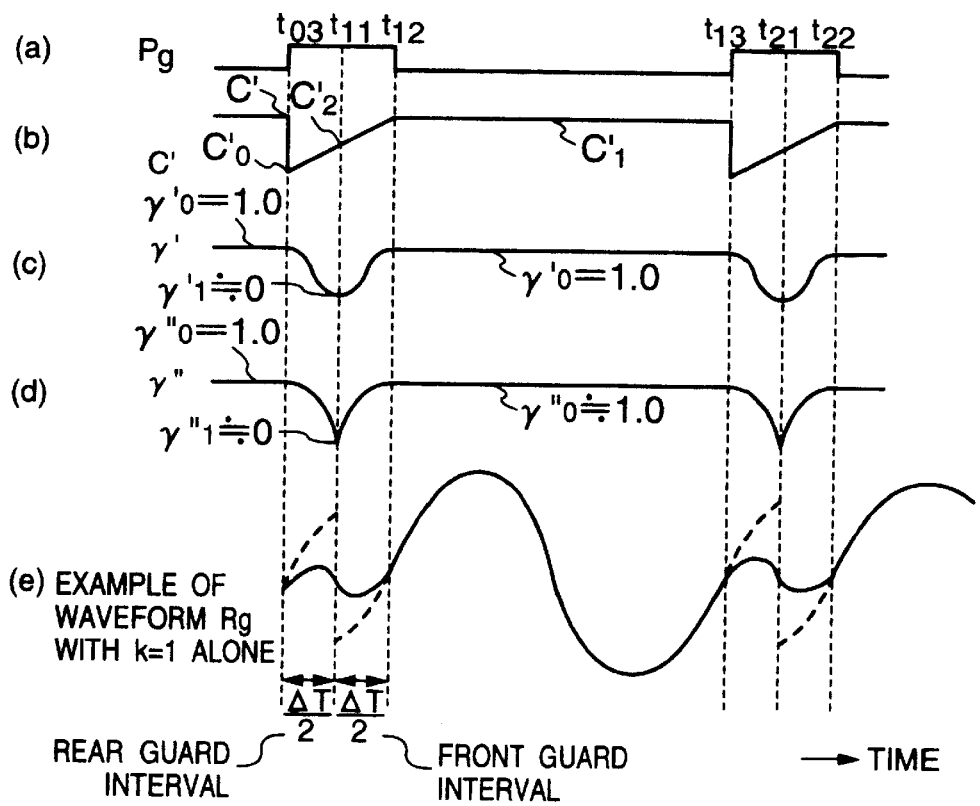
FIG. 17 is a timing chart of signals for explaining the operation of the amplitude controller shown in FIG. 16.

Still another embodiment of the present invention having the change ratio of the multiplying coefficient γ thus made gentle will now be described by referring to FIG. 16. In the present embodiment, the symbol edge signal generator 2 of the embodiment shown in FIG. 9 is not used, and the amplitude controller 1 is altered as shown in FIG. 16. In other words, the amplitude control signal generation circuit 1B in the amplitude controller 1 is formed by a counter 1-5 and a memory (such as a ROM or a table) 1-6. FIG. 17 is a timing chart of signals illustrating the operation of the amplitude controller 1 shown in FIG. 16. The counter 1-5 is supplied with the pulse $P_g$ from the guard interval adder 82 and the clock from a clock generator not illustrated. In other words, the counter 1-5 is reset in response to the rising edge of the pulse $P_g$ (at time $t_{X3}$) so as to have an output value $c_0'$. Thereafter, the counter 1-5 counts the clock pulses until the falling edge of the pulse $P_g$ (at time $t_{X2}$). At the time $t_{X2}$, the count value c' becomes $c_1'$. The count value of the counter 1-5 is output to the memory 1-6. By using the count value c' as the address, the memory 1-6 reads out a multiplying coefficient γ' stored beforehand. The multiplying coefficient γ' is a value preset according to the count value c'. For example, $γ'_0=1.0$ when $c'=c'_0$ as shown in (c) of FIG. 17. As c' is increased from $c'_0$, the multiplying coefficient γ' decreases in a quadratic curve form. At the time of $c'=c'_2$ corresponding to the connection point between adjacent entire symbol durations (i.e., the center point of the guard interval ΔT), γ' becomes approximately 0. Thereafter, as c' is increased from $c'_2$, the multiplying coefficient γ' increases in a quadratic curve form. At the time of c'=c'1 corresponding to the end time point of the guard interval, $γ'_0$ becomes approximately 1.0.

Near the time $t_{X3}$ and the time $t_{X2}$ which are respectively the start time point of the rear guard interval and the end time point of the front guard interval, the change rate of the multiplying coefficient γ' is thus made gentle. Therefore, the difference in level of the waveform becomes extremely small.

Furthermore, the multiplying coefficient γ" may change in a sinusoidal form according to the coefficient value c' as shown in (d) of FIG. 17.

In the present embodiment, therefore, occurrence of side lobes can be suppressed as compared with the embodiment of FIG. 9.

Figure 5:
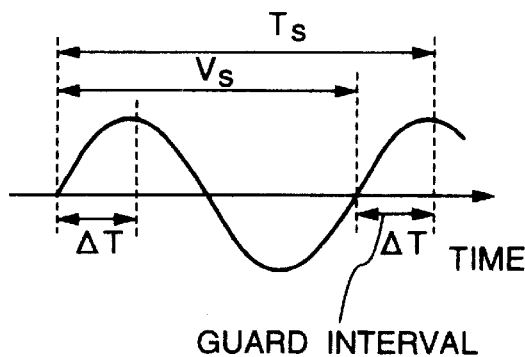
FIG. 5 is a waveform diagram showing such a state that a rear guard interval having duration of $\Delta T$ has been added to a carrier wave of k=1.
Figure 18:
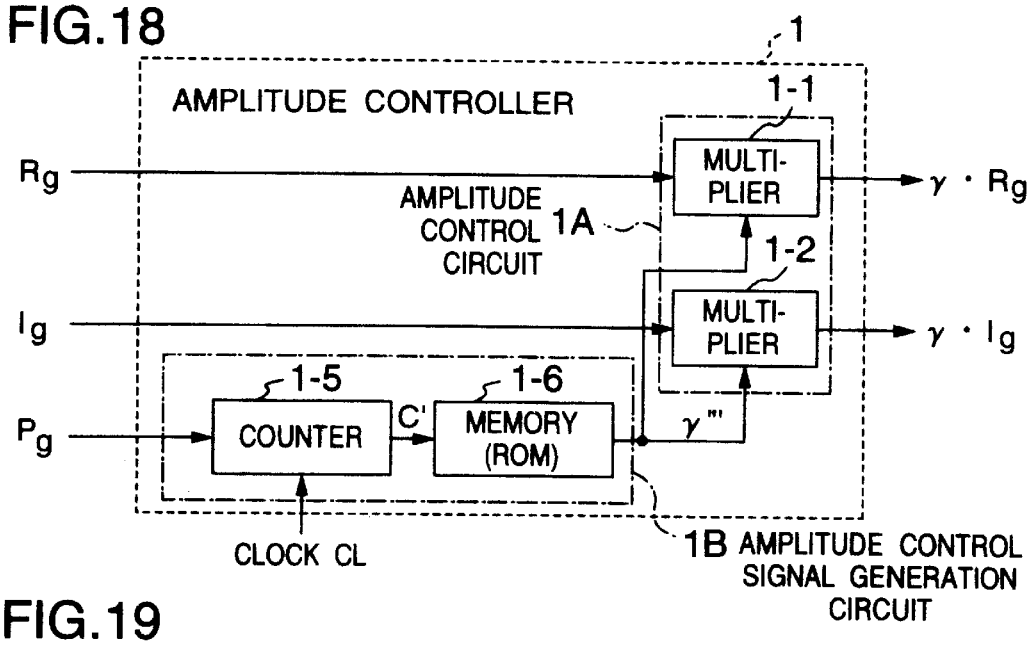
FIG. 18 is a block diagram showing an example of the configuration of the amplitude controller in yet another embodiment of the present invention.
Figure 19:
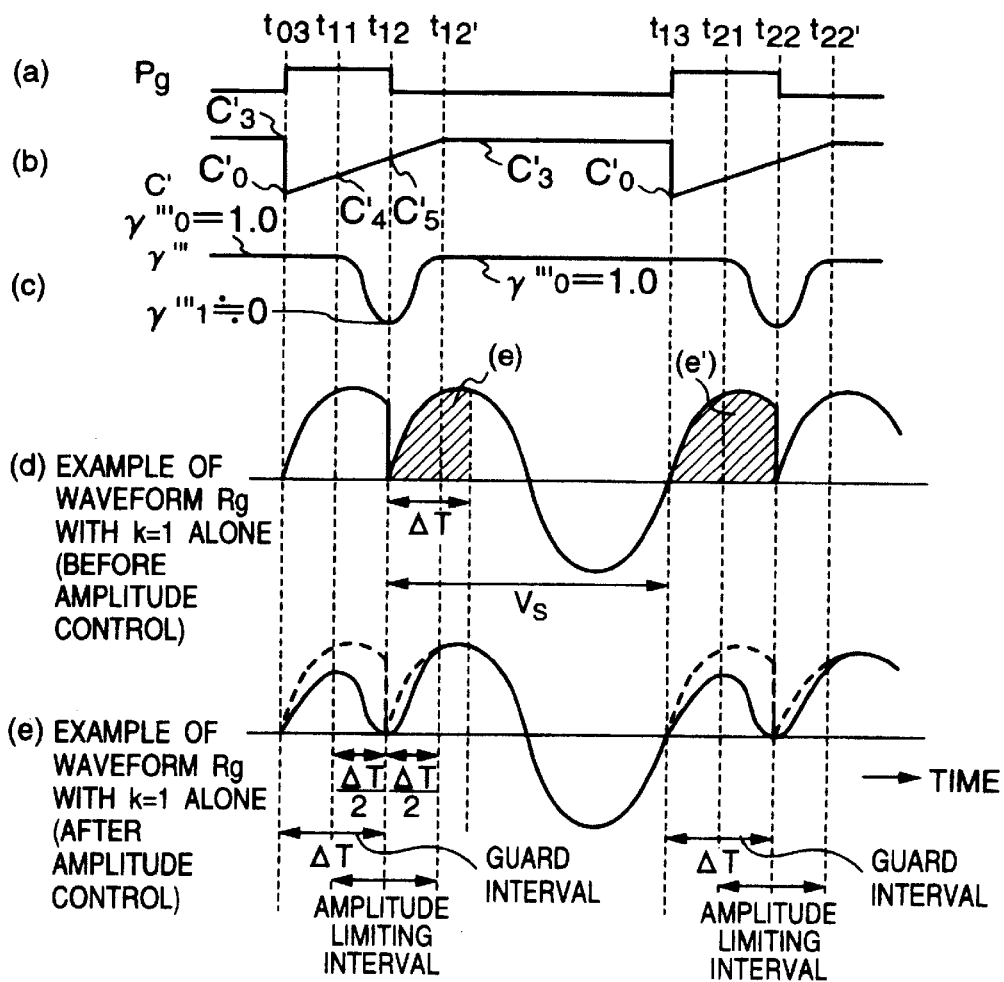
FIG. 19 is a timing chart of signals for explaining the operation of the amplitude controller shown in FIG. 18.
Figure 20:
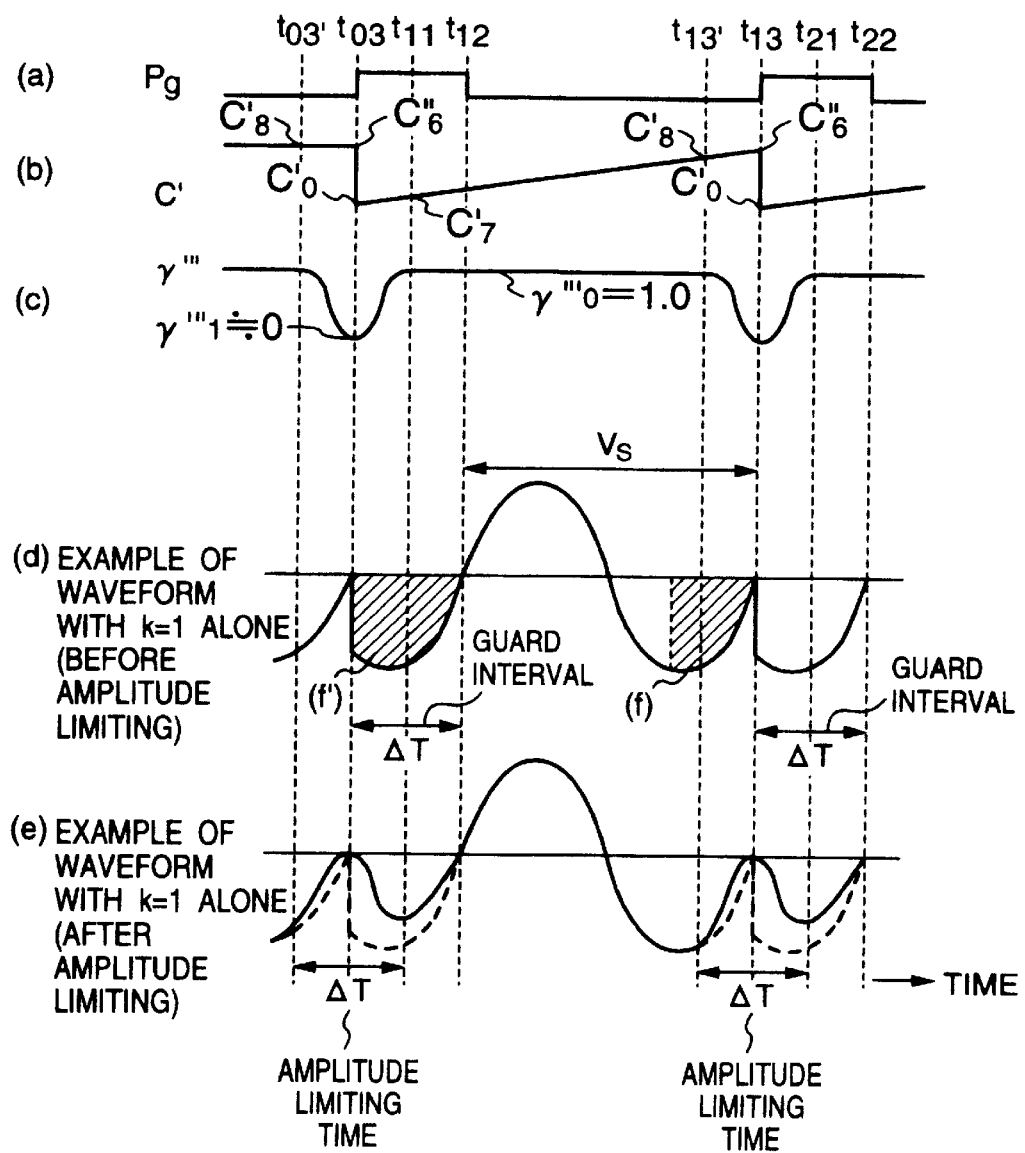
FIG. 20 is a timing chart of signals for explaining the operation of a variant of the embodiment shown in FIG. 18.

Still another embodiment in which the present invention has been applied to such an OFDM modulation system that a guard interval having duration ΔT as shown in FIG. 5 is added to the front edge or the rear edge of the effective symbol duration will now be described. FIG. 18 is a block diagram showing an example of the configuration of the amplitude controller in the present embodiment. FIGS. 19 and 20 are timing charts of signals illustrating the operation of the amplitude controller shown in FIG. 18. The configuration of the present embodiment is nearly the same as that of the embodiment shown in FIG. 16.

In the present embodiment, a waveform (e) having duration ΔT located in a start portion of the effective symbol duration $V_S$ is added after the end edge of the effective symbol duration to form a guard interval waveform (e') of duration ΔT as shown in (d) of FIG. 19. Or a waveform (f) having duration ΔT located in an end portion of the effective symbol duration $V_S$ is added before the start edge of the effective symbol duration to form a guard interval waveform (f') of duration ΔT as shown in (d) of FIG. 20. In the case where the guard interval has been added as shown in (d) of FIG. 19, the waveform becomes discontinuous and the difference in level becomes extremely large at the connection point (such as time $t_{12}$ and $t_{22}$) between the effective symbol and the guard interval. In the same way, in the case where the guard interval has been added as shown in (d) of FIG. 20, the waveform becomes discontinuous and the difference in level becomes extremely large at the connection point (such as time $t_{03}$ and $t_{13}$) between the effective symbol and the guard interval.

In the present embodiment, therefore, attenuation is effected only during an interval having duration substantially equivalent to the duration $\Delta T$ of the guard interval and centering around the connection point between each guard interval and an effective symbol duration adjacent thereto. In addition, attenuation is effected so as to maximize the attenuation substantially at the connection point.

First of all, the configuration and operation of the amplitude controller 1 of the case where the guard interval is added as shown in (d) of FIG. 19 will be described by referring to FIGS. 18 and 19.

In FIG. 18, the configuration and function of the amplitude control circuit 1A are the same as those of the foregoing embodiments.

The counter 1-5 is reset in response to the rising edge of the pulse $P_g$ (at time $t_{X3}$ such as $t_{03}$ and $t_{13}$) so as to have an output value $c_0'$. Thereafter, the counter 1-5 counts the clock pulses until the output value becomes a predetermined value $c_3'$ (at time $t_{X2}$ such as time $t_{12}'$ and $t_{22}'$). The count value $c'$ becomes $c_4'$ at time $t_{X1}$ (such as time $t_{11}$ and $t_{21}$), and becomes $c_5'$ at time $t_{X2}$ (such as time $t_{12}$ and $t_{22}$).

By using the count value $c'$ supplied from the counter 1-5 as the address, the memory 1-6 reads out a multiplying coefficient $\gamma'''$ stored beforehand. The multiplying coefficient $\gamma'''$ is a value preset according to the count value $c'$. For example, $\gamma'''_0=1.0$ when $c'=c'_4$ as shown in (c) of FIG. 19. As $c'$ is increased from $c'4$, the multiplying coefficient $\gamma'''$ decreases in a quadratic curve or sine wave form. At the time of $c'=c'_5$ corresponding to the connection point between a guard interval and an effective symbol duration adjacent thereto, $\gamma'''$ becomes approximately 0. Thereafter, as $c'$ is increased from $c'_5$, the multiplying coefficient $\gamma'''$ increases in a quadratic curve or sine wave form. At the time $t_{X2}$ (such as time $t_{12}'$ and $t_{22}'$) when $c'=c'_5$, $\gamma'''_0$ returns to 1.0.

Over the interval centering around the connection point between the guard interval and the effective symbol duration adjacent thereto, the multiplying coefficient $\gamma'''$ is thus reduced gradually. And the multiplying coefficient $\gamma'''$ is made nearly equal to 0 at the connection point having a large difference in level. As a whole, therefore, the difference in level of the waveform becomes extremely small.

Subsequently, the configuration and operation of the amplitude controller 1 of the case where the guard interval is added as shown in (d) of FIG. 20 will be described by referring to FIGS. 18 and 20.

In FIG. 18, the configuration and function of the amplitude control circuit 1A are the same as those of the foregoing embodiments.

The counter 1-5 is reset in response to the rising edge of the pulse $P_g$ (at time $t_{X3}$ such as $t_{03}$ and $t_{13}$) so as to have an output value $c_0'$. Thereafter, the counter 1-5 counts the clock pulses until the rising edge of the next pulse $P_g$. The count value $c'$ becomes $c_7'$ at time $t_{X1}$ (such as time $t_{11}$ and $t_{21}$), becomes $c_8'$ at time $t_{13}'$ preceding the time $t_{X3}$ by $\Delta T/2$ (such as time $t_{03}'$ and $t_{13}'$), and becomes $c_6'$ at time $t_{X3}$ (such as time $t_{03}$ and $t_{13}$).

By using the count value $c'$ supplied from the counter 1-5 as the address, the memory 1-6 reads out a multiplying coefficient $\gamma\perp'''$ stored beforehand. The multiplying coefficient $\gamma'''$ is a value preset according to the count value $c'$. For example, $\gamma'''0=1.0$ over an interval between $c'=c'_7$ and $c'=c'_8$ as shown in (c) of FIG. 19. As $c'$ is increased from $c'_8$, the multiplying coefficient $\gamma'''$ decreases in a quadratic curve or sine wave form. When $c'=c'_6$ ($c'=c'_0$) corresponding to the connection point between a guard interval and an effective symbol duration adjacent thereto is reached, $\gamma'''$ becomes approximately 0. Thereafter, as $c'$ is increased from $c'_0$, the multiplying coefficient $\gamma'''$ increases in a quadratic curve or sine wave form. At the time $t_{X1}$ (such as time $t_{11}$ and $t_{21}$) when $c'=C'_7$, $\gamma'''_0$ returns to 1.0.

Over the interval centering around the connection point between the guard interval and the effective symbol duration adjacent thereto, the multiplying coefficient $\gamma'''$ is thus reduced gradually. And the multiplying coefficient $\gamma'''$ is made nearly equal to 0 at the connection point having a large difference in level. As a whole, therefore, the difference in level of the waveform becomes extremely small.

In the present embodiment as well, the interval over which the amplitude of each of the signals $R_g$ and $I_g$ is reduced, i.e., the interval over which the multiplying coefficient $\gamma'''$ is made less than 1.0 is made equal to the guard interval $\Delta T$. However, the interval over which the multiplying coefficient $\gamma'''$ is made less than 1.0 needs only be substantially equal to the guard interval $\Delta T$, and may be longer than the guard interval $\Delta T$ or shorter than the guard interval $\Delta T$. Here, the expression that the interval over which the multiplying coefficient $\gamma'''$ is made less than 1.0 is substantially equal to the guard interval $\Delta T$ means that the interval over which the multiplying coefficient $\gamma'''$ is made less than 1.0 is an interval having duration approximately 10% of the entire symbol duration $T_S$.

For example, in the case where 25% of the effective symbol duration is the guard interval, the interval over which the multiplying coefficient $\gamma'''$ is made less than 1.0 is made at most 10% of the entire symbol duration $T_S$.

According to the present invention, it is possible to sufficiently suppress the occurrence of side lobes and reduce the out-band leakage spectra by using such a simple configuration as to control the amplitude of a composite signal every specific interval, i.e., every guard interval of the composite carrier signal with a guard interval added. As a result, it becomes possible to sufficiently lower the dependence upon the filter. Without using a nonpractical filter, and furthermore without the necessity of using a filter, therefore, it is possible to easily provide a small-sized, low cost OFDM modulator.

What is claimed is:

1. An orthogonal frequency division multiplex modulator of such a system as to add guard intervals to a temporal waveform generated by modulating an input data train into a large number of carriers, conducting quadrature modulation, and outputting an OFDM signal, said orthogonal frequency division multiplex modulator comprising:

an IFFT circuit for conducting inverse fast Fourier transform processing to modulate said input data train into a large number of carriers;

a guard interval adder for adding a guard interval to each effective symbol duration of a composite carrier signal supplied from said IFFT circuit and outputting a resultant signal;

a control signal generator for generating, in synchronism with each guard interval of the composite carrier signal having the guard intervals added thereto from said guard interval adder, such a control signal as to attenuate signal amplitude of said composite carrier signal having the guard intervals over an interval substantially equal in length to said each guard interval; and an amplitude controller responsive to said control signal, to attenuate an amplitude of the composite carrier signal having the guard intervals supplied from said guard interval adder and output a resultant signal, only over an interval substantially equal in length to said each guard interval, said amplitude controller outputting, in remaining intervals, said composite carrier signal having the guard intervals supplied from said guard interval adder as it is.

2. An orthogonal frequency division multiplex modulator according to claim 1, wherein said control signal generator generates, in synchronism with each guard interval of the composite carrier signal having the guard intervals added thereto, such a control signal as to attenuate signal amplitude of said composite carrier signal having the guard intervals over an interval which is substantially the same in timing as said each guard interval, and wherein said amplitude controller is responsive to said control signal, to attenuate the amplitude of the composite carrier signal having the guard intervals supplied from said guard interval adder and output a resultant signal, only over an interval which is substantially the same in timing as said each guard interval, said amplitude controller outputting, in remaining intervals, said composite carrier signal having the guard intervals supplied from said guard interval adder as it is.

3. An orthogonal frequency division multiplex modulator according to claim 2, wherein said control signal generator generates such a control signal as to gradually increase attenuation of the amplitude of said composite carrier signal having the guard intervals added thereto, substantially from a start point of said each guard interval, maximize the attenuation nearly in a central part of said guard interval to make the amplitude of said composite carrier signal equal to substantially zero, thereafter gradually decrease the attenuation, and make the attenuation equal to zero substantially at an end point of said guard interval.

4. An orthogonal frequency division multiplex modulator according to claim 2, wherein said control signal generator comprises a counter for counting clock pulses substantially from a start point of said guard interval, and a memory for reading out the control signal to attenuate the signal amplitude of said composite carrier signal according to a count value of said counter and outputting the control signal.

5. An orthogonal frequency division multiplex modulator according to claim 2, wherein said control signal generator generates, in synchronism with each guard interval of the composite carrier signal having the guard intervals added thereto, such a control signal as to attenuate signal amplitude of said composite carrier signal, over an interval which centers around a connection point between said guard interval and an effective symbol duration adjacent thereto and which is substantially equal in length to said guard interval, and wherein said amplitude controller is responsive to said control signal, to attenuate the amplitude of the composite carrier signal supplied from said guard interval adder and output a resultant signal, only over an interval which centers around a connection point between said guard interval and an effective symbol duration adjacent thereto and which is substantially equal in length to said guard interval, said amplitude controller outputting, in remaining intervals, the composite carrier signal supplied from said guard interval adder as it is.

6. An orthogonal frequency division multiplex modulator according to claim 5, wherein said control signal generator generates such a control signal as to gradually increase attenuation of the amplitude of said carrier signal having the guard intervals added thereto, from a time point earlier than said connection point by substantially half of the duration of the guard interval, maximize the attenuation substantially at said connection point to make the amplitude of the composite carrier signal equal to substantially zero, thereafter gradually decrease the attenuation, and make the attenuation equal to zero at a time point later than said connection point by substantially half of the duration of the guard interval.

7. An orthogonal frequency division multiplex modulator according to claim 5, wherein said control signal generator comprises a counter for counting clock pulses substantially from a start point of said guard interval, and a memory for reading out the control signal to attenuate the signal amplitude of said composite carrier signal according to a count value of said counter and outputting the control signal.

8. An orthogonal frequency division multiplex modulator of such a system as to add guard intervals to a temporal waveform generated by modulating an input data train into a large number of carriers, said orthogonal frequency division multiplex modulator comprising:

an IFFT circuit for conducting inverse fast Fourier transform processing to modulate said input data train into a large number of carriers;

a guard interval adder for adding a guard interval to each effective symbol duration of a composite carrier signal supplied from said IFFT circuit and outputting a resultant signal;

a control signal generator for generating, in synchronism with each guard interval of the composite carrier signal supplied from said guard interval adder, such a control signal as to attenuate signal amplitude of said composite carrier signal over an interval substantially equal in length to said each guard interval; and an amplitude controller responsive to said control signal, to attenuate the amplitude of the composite carrier signal supplied from said guard interval adder and output a resultant signal, only over an interval substantially equal in length to said each guard interval, said amplitude controller outputting, in remaining intervals, said composite carrier signal supplied from said guard interval adder as it is; and a quadrature processor for conducting quadrature modulation on the signal supplied from said amplitude controller and outputting an OFDM signal.

9. An orthogonal frequency division multiplex modulator according to claim 8, wherein said control signal generator generates, in synchronism with each guard interval of the composite carrier signal having the guard intervals added thereto, such a control signal as to attenuate signal amplitude of said composite carrier signal over an interval which is substantially the same in timing as said each guard interval, and wherein said amplitude controller is responsive to said control signal, to attenuate the amplitude of the composite carrier signal supplied from said guard interval adder and output a resultant signal, only over an interval which is substantially the same in timing as said each guard interval, said amplitude controller outputting, in remaining intervals, said composite carrier signal supplied from said guard interval adder as it is.

10. An orthogonal frequency division multiplex modulator according to claim 9, wherein said control signal generator generates such a control signal as to gradually increase attenuation of the amplitude of said composite carrier signal having the guard intervals added thereto, substantially from a start point of said each guard interval, maximize the attenuation nearly in a central part of said guard interval to make the amplitude of said composite carrier signal equal to substantially zero, thereafter gradually decrease the attenuation, and make the attenuation equal to zero substantially at an end point of said guard interval.

11. An orthogonal frequency division multiplex modulator according to claim 9, wherein said control signal generator comprises a counter for counting clock pulses substantially from a start point of said guard interval, and a memory for reading out the control signal to attenuate the signal amplitude of said composite carrier signal according to a count value of said counter and outputting the control signal.

12. An orthogonal frequency division multiplex modulator according to claim 8, wherein said control signal generator generates, in synchronism with each guard interval of the composite carrier signal having the guard intervals added thereto, such a control signal as to attenuate signal amplitude of said composite carrier signal, over an interval which centers around a connection point between said guard interval and an effective symbol duration adjacent thereto and which is substantially equal in length to said guard interval, and wherein said amplitude controller is responsive to said control signal, to attenuate the amplitude of the composite carrier signal supplied from said guard interval adder and output a resultant signal, only over an interval which centers around a connection point between said guard interval and an effective symbol duration adjacent thereto and which is substantially equal in length to said guard interval, said amplitude controller outputting, in remaining intervals, the composite carrier signal supplied from said guard interval adder as it is.

13. An orthogonal frequency division multiplex modulator according to claim 12, wherein said control signal generator generates such a control signal as to gradually increase attenuation of the amplitude of said carrier signal having the guard intervals added thereto, from a time point earlier than said connection point by substantially half of the duration of the guard interval, maximize the attenuation substantially at said connection point to make the amplitude of the composite carrier signal equal to substantially zero, thereafter gradually decrease the attenuation, and make the attenuation equal to zero at a time point later than said connection point by substantially half of the duration of the guard interval.

14. An orthogonal frequency division multiplex modulator according to claim 12, wherein said control signal generator comprises a counter for counting clock pulses substantially from a start point of said guard interval, and a memory for reading out the control signal to attenuate the signal amplitude of said composite carrier signal according to a count value of said counter and outputting the control signal.

15. An orthogonal frequency division multiplex modulation method of such a system as to add guard intervals to a temporal waveform generated by modulating an input data train into a large number of carriers, conducting quadrature modulation, and outputting an OFDM signal, said orthogonal frequency division multiplex modulation method comprising the steps of:

(a) conducting inverse fast Fourier transform processing to modulate said input data train into a large number of carriers;

(b) adding a guard interval to each effective symbol duration of a composite carrier signal obtained by said step (a); and (c) attenuating signal amplitude of said composite carrier signal having the guard intervals added thereto and outputting a resultant signal, only over an interval substantially equal in length to said each guard interval, and outputting, in remaining intervals, said composite carrier signal obtained by said step (b) as it is.

16. An orthogonal frequency division multiplex modulation method according to claim 15, wherein said step (c) comprises the step of attenuating the amplitude of the composite carrier signal having the guard intervals added thereto and outputting a resultant signal, only over an interval which is substantially the same in timing as said each guard interval, and outputting, in remaining intervals, said composite carrier signal obtained by said step (b) as it is.

17. An orthogonal frequency division multiplex modulation method according to claim 16, wherein said step (c) comprises the step of gradually increasing attenuation of the amplitude of said composite carrier signal having the guard intervals added thereto, substantially from a start point of said each guard interval, maximizing the attenuation nearly in a central part of said guard interval to make the amplitude of said composite carrier signal equal to substantially zero, thereafter gradually decreasing the attenuation, and making the attenuation equal to zero substantially at an end point of said guard interval.

18. An orthogonal frequency division multiplex modulation method according to claim 15, wherein said step (c) comprises the step of attenuating signal amplitude of said composite carrier signal having the guard intervals added thereto and outputting a resultant signal, only over an interval which centers around a connection point between said guard interval and an effective symbol duration adjacent thereto and which is substantially equal in length to said guard interval, and outputting, in remaining intervals, said composite carrier signal obtained by said step (b) as it is.

19. An orthogonal frequency division multiplex modulation method according to claim 18, wherein said step (c) comprises the step of gradually increasing attenuation of the amplitude of said carrier signal having the guard intervals added thereto, from a time point earlier than said connection point by substantially half of the duration of the guard interval, maximizing the attenuation substantially at said connection point to make the amplitude of said composite carrier signal equal to substantially zero, thereafter gradually decreasing the attenuation, and making the attenuation equal to zero at a time point later than said connection point by substantially half of the duration of the guard interval.

* * * * *